US010847055B2

(12) United States Patent
Nachimovsky

(10) Patent No.: US 10,847,055 B2
(45) Date of Patent: Nov. 24, 2020

(54) INTERLINEAR TARGUM

(71) Applicant: Jacob Nachimovsky, New York, NY (US)

(72) Inventor: Jacob Nachimovsky, New York, NY (US)

( * ) Notice: Subject to any disclaimer, the term of this patent is extended or adjusted under 35 U.S.C. 154(b) by 0 days.

(21) Appl. No.: 15/435,289

(22) Filed: Feb. 16, 2017

(65) Prior Publication Data
US 2020/0273370 A1   Aug. 27, 2020

Related U.S. Application Data

(60) Provisional application No. 62/296,068, filed on Feb. 16, 2016.

(51) Int. Cl.
*G09B 19/08* (2006.01)
*G09B 19/00* (2006.01)

(52) U.S. Cl.
CPC .............. *G09B 19/08* (2013.01); *G09B 19/00* (2013.01)

(58) Field of Classification Search
CPC ........ G09B 17/00; G09B 19/06; G09B 19/08; G06F 40/20; G06F 40/226; G06F 40/237; G06F 40/263; G06F 40/40; G06F 40/53
See application file for complete search history.

(56) References Cited

U.S. PATENT DOCUMENTS

| | | | |
|---|---|---|---|
| 2002/0077804 A1* | 6/2002 | Gohari | G06F 40/45 704/2 |
| 2016/0133154 A1* | 5/2016 | Cortes | G09B 5/065 434/157 |
| 2016/0225278 A1* | 8/2016 | Leddy | G09B 5/06 |

* cited by examiner

*Primary Examiner* — Omkar A Deodhar
(74) *Attorney, Agent, or Firm* — Mark David Torche; Pawrite Law

(57) ABSTRACT

A learning aid for learning a primary text along with a related secondary text, such as a translation of the primary text. The secondary text is interlineated with the primary text. Highlighting and flagging specific portions of the text may be done by using color coding, symbols, and similar techniques known in the relevant art. Further, coordinated spacing is used to line up similar words, and gaps are inserted where the words of the primary text and secondary text do not correspond directly. Also disclosed is a method for learning a manuscript using this learning aid. Further disclosed is a learning aid for learning cantillation of a primary text by color coding the cantillation notations.

16 Claims, 6 Drawing Sheets
(6 of 6 Drawing Sheet(s) Filed in Color)

Fig. 6

INTERLINEAR TARGUM

CROSS-REFERENCES TO RELATED APPLICATIONS

This application claims the benefit of U.S. Provisional Application No. 62/296,068 filed on Feb. 16, 2016, as if that application was included in full herein.

FIELD OF THE INVENTION

This invention regards translations of foreign language texts, and, more specifically, the translation of texts written in Aramaic.

BACKGROUND OF THE INVENTION

Aramaic is a Semitic language which was the common language ("lingua franca") of a large portion of the Near East for about fourteen centuries, from about 7th century BCE until about the 7th century CE. The Classical or Imperial version of Aramaic was the main language of the Persian, Babylonian and Assyrian empires.

Aramaic ceased to be the official language of any major state after Alexander the Great destroyed the Persian Empire; however, Aramaic continued to be spoken widely. Today, Aramaic continues to be spoken, albeit it is not widespread.

At one time, Aramaic was the main language of the Jews. Aramaic is seen in some of the Dead Sea Scrolls and other portions of the Hebrew Bible.

Aramaic is also a main language of the Talmud.

During the period when Aramaic was the lingua franca of the Jews, the masses did not sufficiently understand many Jewish Scriptures which were written in the Hebrew language. Thus, these Scriptures were paraphrased, explained, and commented upon to the masses in Aramaic.

Often, these Scriptures were translated from Hebrew to Aramaic. Each translation was known as a "targum", the Aramaic word for "explanation", "interpretation", or "explicit". Some of these targumim (plural of targum) remain extant today.

The most important and most widely studied targum is Targum Onkelos on the Torah; it was written down by Onkelos the son of Klonimus. Targum Onkelos is commonly referred to simply as the "Targum".

The Targum is given official status through its mention in the Babylonian Talmud. In many ancient synagogues, the Targum was read out loud, in Aramaic, at the time of the weekly public reading of the Torah, alternating verse by verse between the Hebrew Bible and the Targum. Today, this tradition is continued in Yemenite synagogues.

The Targum continues to be widely studied as a major commentary on the Torah.

The Targum helped to preserve and clarify the meaning of the Hebrew Bible.

Beyond a mere translation of the words, the Targum adds tone, imagery, metaphor, simile, and poetry to the text of the Hebrew Bible to give a more complete meaning of the words.

Because the language of the Targum is Aramaic, it was an essential tool for the population when Aramaic was the lingua franca. However, once use of Aramaic faded, use of the Targum also faded. Consequently, the Targum has been largely ignored for thousands of years.

Nevertheless, as with most texts, the only way to really understand the Targum, however, is if one tries to study it in its original language—Aramaic. Further, by understanding the Targum in its original language, one learns Aramaic, which may open up a much deeper understanding of the Talmud with its extensive use of Aramaic.

Thus, because understanding of Aramaic is very rare in the modern world, tools are needed to bring the text of the Targum to the modern masses.

BRIEF SUMMARY OF THE INVENTION

An object of the present invention is a learning aid for a manuscript to help coordinate a primary text of the manuscript with a secondary text related to the primary text.

Another object of the present invention is a learning aid for a manuscript to help coordinate a primary text of the manuscript with a translation of the primary text.

Yet another object of the present invention is a learning aid for a manuscript which allows for use of a lesser known translation.

Another object of the present invention is to center the primary text and coordinate the secondary text to the primary text sir gar it concentrates focus on both the primary and the secondary text.

In short, the present invention comprises a learning aid for learning a primary text along with a related secondary text, such as an elucidation of the primary text. The secondary text is interlineated with the primary text. Highlighting and flagging specific portions of the text may be done by using color coding, symbols, and similar techniques known in the relevant art. Further, coordinated spacing is used to line up similar words, and gaps are inserted where the words of the primary text and secondary text do not correspond directly.

Also disclosed is a method for learning a manuscript using this learning aid.

Further disclosed is a learning aid for learning cantillation of a primary text by color coding the cantillation notations.

BRIEF DESCRIPTION OF THE SEVERAL VIEWS OF THE DRAWING

The patent or application file contains at least one drawing executed in color. Copies of this patent or patent application publication with color drawing(s) will be provided by the Office upon request and payment of the necessary fee.

FIG. 3 illustrates a first portion of the embodiment shown in FIG. 1 with center balanced and interlineated Torah Hebrew text above and Targum Aramaic below.

FIG. 4 illustrates a second portion of the embodiment shown in FIG. 1 with center balanced and interlineated Torah Hebrew text above and Targum Aramaic below.

FIG. 5 illustrates a third portion of the embodiment shown in FIG. 1 with center balanced and interlineated Torah Hebrew text above and Targum Aramaic below.

FIG. 6 illustrates a reference page of another embodiment of this invention: color coding the cantillation notes ("ta'amim") of the Torah text with the corresponding words of the Torah text.

DESCRIPTION OF THE INVENTION

Figure 1:
FIG. 1 illustrates a title page of one embodiment of this invention, encompassing a beginning section of a portion of the Torah known as "Vayechi", having the name "Vayechi" in Hebrew above and in the Targum Aramaic below.
Figure 2:
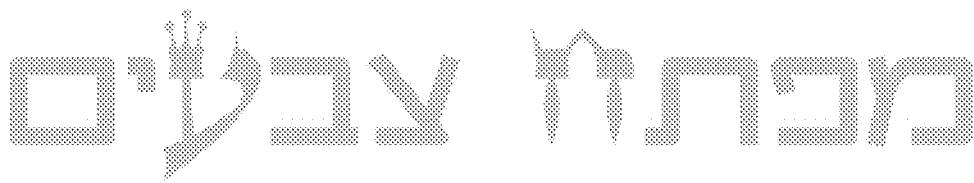
FIG. 2 illustrates a reference page of the embodiment shown in FIG. 1, this reference page serving as a key to the scripts, symbols, and color coding used.

This invention is a system and method of presenting effectively a targum to those individuals who are not fluent in Aramaic.

Among the features comprising this invention are:
(1) interlinear Aramaic explanation;
(2) color coded to distinguish translation from explanation;
(3) 3) center balanced to focus the reader on ideas in the text and elucidation. Although there are no synonyms in Hebrew words that are often mistaken for synonyms are included and seemingly synonymous words are highlighted;
(4) Ashurite Torah script with vowelization, preserving the shape and structure of the text as written in an authentic Torah scroll (tractate of scribes 1.2) in instances of "Shira" "The Ten Utterances" and various other unique layouts from the Torah such as "Vayehi Binsoa Haaron";
(5) ancient Torah script used for Aramaic for differentiation and aesthetic effect;
(6) symbols used to highlight certain parts of text to further aid the student;
(7) a clean simple modern design;
(8) text is broken up into sensible bits of information, instead of running on wrapping around the page and information is organized visually;
(9) create visual and phonetic links by placing letters of the alphabet within common words for example פace face. כup cup עideo video;
(10) Using color to show when the text is speaking harsh words in red the color of conflict, and when there is an amazing explanation it is in pink a bright beautiful color. Just by looking at the color you can see this area is a hard portion and this area contains an amazing explanation before even reading the text;
(11) Coloring certain words to give their meaning. For example (without limitation), the word "gold" would be colored gold, and the word "grass" would be colored green.
(12) Using the colors associated with Kabbalah;
(13) Mention the mirroring of identical words and the gapping for extra words.

For illustrative and representative purposes, this Specification will discuss an embodiment of this invention utilizing the Targum. Clearly, other embodiments of this invention may utilize other targumim and Aramaic texts.

For purposes of clarity, efficiency, and ease of use of the reader, the Targum text is visually set off from the Torah text by the distinctive scripts discussed above. Further, the Targum text is interspersed with the symbols and color coding discussed above.

Other embodiments of this invention may be utilized with a system of indicating the cantillation of the Torah text. There are approximately twenty-two (22) individual cantillation/musical notations ("ta'amim", singular "ta'am"); one or more of these notations are annexed to each word of the Torah text. These notations provide directions for sounding out the text as well as providing interpretation and spacing of the text.

Actual scrolls of the Torah text are written exclusively in black and do not contain the musical notations. Thus, the notations must be memorized, which is frequently an arduous task.

Each notation preferably has its own color coding. Each word of the Torah text is color coded to match the coding of the notation(s) annexed to that word. This color coding system helps facilitate visual recognition, learning, and memory cues of the proper cantillation of the Torah text. Thus, the learning process is simplified.

Figure 6:
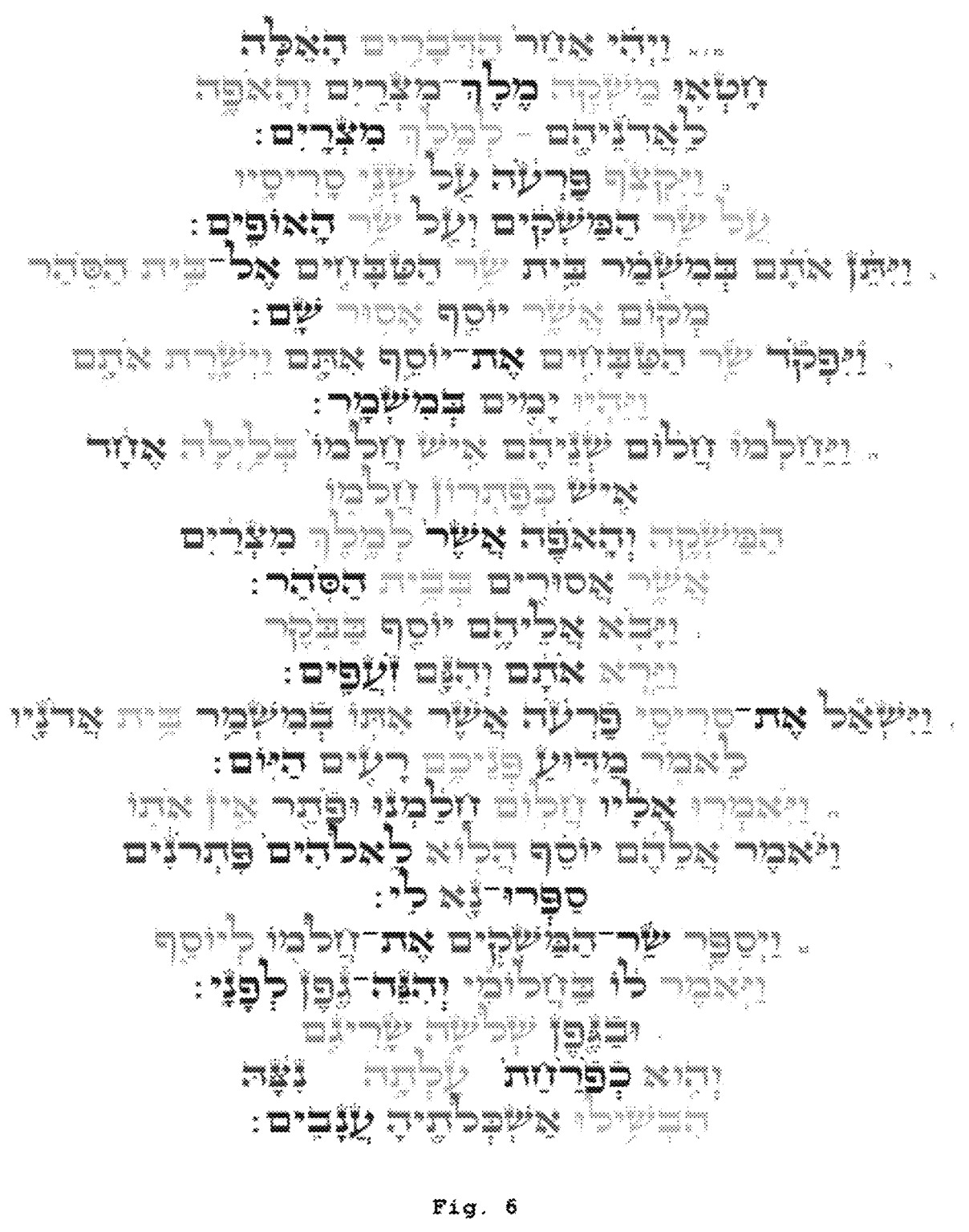

By way of example only, and without limitation (see FIG. 6):
(a) The end of each sentence is indicated in Black to indicate visually the end of a sentence;
(b) The notation called "Revi'i" is shown in Red; and
(c) Other modifications are utilized to facilitate the cantillation/reading of the Torah text.

Although this invention has been described with a certain degree of particularity, it is to be understood that the present disclosure (including, without limitation, all drawing pages) has been made only by way of illustration, and that numerous changes in the details of the system, apparatus, and/or method may be resorted to without departing from the spirit and scope of the invention.

For example, as mentioned above, embodiments of this invention may utilize targumim and Aramaic texts other than the Targum (Onkelos).

What is claimed is:

1. A manuscript comprising a primary text having cantillation/musical notations, the manuscript comprising:
a secondary text related to the primary text, the secondary text being interlineated with the primary text; and
color coding associated with the cantillation/musical notations of the primary text, wherein visual recognition, learning, and memory cues of said proper cantillation or musical notations are provided to enhance the visual recognition, learning, and memory cues of the proper cantillation of the text; and
wherein words of similar meaning between the primary text and the secondary text are highlighted.

2. The manuscript as in claim 1, wherein the primary text and the secondary text are centered with respect to each other.

3. The manuscript as in claim 1, wherein the primary text utilizes a first font and the secondary text utilizes a second font, and the first font is different from the second font.

4. The manuscript as in claim 1, wherein the primary text utilizes a first color and the secondary text utilizes a second color, and the first color is different from the second color.

5. The manuscript as in claim 1, wherein the primary text utilizes a first size and the secondary text utilizes a second size, and the first size is different from the second size.

6. Previously presented as in claim 1, wherein a color coding is used in cooperation with the primary and secondary texts to provide a distinction for a part of one or both texts.

7. The manuscript as in claim 1, wherein a symbol is used in cooperation with the primary and secondary texts to provide a distinction for a part of one or both texts.

8. The manuscript as in claim 1, wherein the secondary text is a translation of the primary text.

9. The manuscript as in claim 8, wherein a synonym is used in cooperation with a portion of the translation.

10. The manuscript as in claim 8, wherein a color is used to associate words that are similar in the primary text and the secondary text.

11. The manuscript as in claim 8, further comprising a color key to highlight different elements of the secondary text, including explication, translation, interpretation, and grammatical tenses.

12. The manuscript as in claim 8, wherein corresponding words from the primary text and the secondary text are vertically aligned with one another.

13. The manuscript as in claim 12, wherein corresponding words from the primary text are placed directly over the secondary text.

14. The manuscript as in claim 8, further comprising a color key to highlight different grammatical tenses of corresponding words from the primary text and the secondary text.

15. The manuscript as in claim 1, further comprising a placement gap in the primary text when there are non-identical words in the secondary text that are explanatory or not identical to a word in the primary text.

16. The manuscript as in claim 15, further comprising highlighting of the non-identical word in the secondary text.

* * * * *